United States Patent
Kang et al.

(10) Patent No.: US 10,979,919 B2
(45) Date of Patent: Apr. 13, 2021

(54) METHOD AND APPARATUS FOR PERFORMING BEAM FAILURE RECOVERY IN A WIRELESS COMMUNICATION

(71) Applicant: LG ELECTRONICS INC., Seoul (KR)

(72) Inventors: Jiwon Kang, Seoul (KR); Eunjong Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/409,638

(22) Filed: May 10, 2019

(65) Prior Publication Data
US 2019/0364445 A1  Nov. 28, 2019

(30) Foreign Application Priority Data
May 10, 2018 (KR) .................. 10-2018-0053978

(51) Int. Cl.
*H04W 24/04* (2009.01)
*H04W 74/08* (2009.01)

(52) U.S. Cl.
CPC ....... *H04W 24/04* (2013.01); *H04W 74/0833* (2013.01)

(58) Field of Classification Search
None
See application file for complete search history.

(56) References Cited

U.S. PATENT DOCUMENTS

| 2018/0302889 A1* | 10/2018 | Guo ..................... H04L 5/0053 |
| 2019/0074880 A1* | 3/2019 | Frenne ................. H04B 7/0626 |
| 2019/0089447 A1* | 3/2019 | Sang ................. H04W 56/0035 |
| 2019/0166513 A1* | 5/2019 | Lin ..................... H04L 5/0048 |
| 2019/0239245 A1* | 8/2019 | Davydov ............. H04W 16/28 |
| 2019/0274169 A1* | 9/2019 | Tsai ..................... H04B 7/088 |
| 2019/0306867 A1* | 10/2019 | Cirik .................. H04W 74/006 |
| 2019/0306909 A1* | 10/2019 | Zhou ..................... H04B 7/08 |

* cited by examiner

*Primary Examiner* — Diane L Lo
(74) *Attorney, Agent, or Firm* — Lee Hong Degerman Kang Waimey

(57) ABSTRACT

A beam failure recovery method in a wireless communication system is disclosed. The beam failure recovery method performed by a user equipment (UE) includes receiving, from a base station, configuration information about a candidate beam reference signal (RS) set, if RS received power (RSRP) values for all of candidate beam RSs and RSRP values for all of synchronization signal blocks (SSBs) connected to a physical random access channel (PRACH) do not exceed a threshold, selecting a CSI-RS within the candidate beam RS set and a beam RS for the BFR among all the SSBs, and transmitting a PRACH preamble to the base station via a PRACH resource connected to the beam RS.

4 Claims, 8 Drawing Sheets

METHOD AND APPARATUS FOR PERFORMING BEAM FAILURE RECOVERY IN A WIRELESS COMMUNICATION

CROSS-REFERENCE TO RELATED APPLICATIONS

Pursuant to 35 U.S.C. § 119(a), this application claims the benefit of earlier filing date and right of priority to Korean Application No. 10-2018-0053978, filed on May 10, 2018, the contents of which are hereby incorporated by reference herein in its entirety.

BACKGROUND OF THE INVENTION

Field of the Invention

The present invention relates to a wireless communication system, and more particularly to a method for performing a beam failure recovery and a device supporting the same.

Description of the Related Art

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

SUMMARY OF THE INVENTION

An object of the present specification is to provide a method for performing a beam recovery by sending a beam recovery request message when a beam failure event occurs due to a movement of a user equipment (UE), etc.

Another object of the present specification is to provide a method for selecting a beam reference signal (RS) for transmitting a beam failure recovery request if RS received power (RSRP) values for an alternative beam RS and all of synchronization signal blocks (SSBs) do not exceed a threshold.

Technical problems to be solved by the present invention are not limited by the technical problems mentioned above, and other technical problems which are not mentioned above can be clearly understood from the following description by those skilled in the art to which the present invention pertains.

The present specification provides a method for performing, by a user equipment (UE), a beam failure recovery (BFR) in a wireless communication system, the method comprising receiving, from a base station, configuration information about a candidate beam reference signal (RS) set; if RS received power (RSRP) values for all of candidate beam RSs and RSRP values for all of synchronization signal blocks (SSBs) connected to a physical random access channel (PRACH) do not exceed a threshold, selecting a CSI-RS within the candidate beam RS set and a beam RS for the BFR among all the SSBs; and transmitting a PRACH preamble to the base station via a PRACH resource connected to the beam RS.

In the present specification, the candidate beam RS set includes only the CSI-RS.

In the present specification, the CSI-RS is configured to be directly connected to the PRACH resource.

In the present specification, all the SSBs are SSBs within a serving cell, within a serving carrier, or within an active bandwidth part (BWP).

The present specification provides a user equipment (UE) for performing a beam failure recovery (BFR) in a wireless communication system, the UE comprising a transmitter configured to transmit a radio signal; a receiver configured to receive the radio signal; and a processor functionally connected to the transmitter and the receiver, wherein the processor is configured to control the receiver to receive, from a base station, configuration information about a candidate beam reference signal (RS) set, if RS received power (RSRP) values for all of candidate beam RSs and RSRP values for all of synchronization signal blocks (SSBs) connected to a physical random access channel (PRACH) do not exceed a threshold, select a CSI-RS within the candidate beam RS set and a beam RS for the BFR among all the SSBs, and control the transmitter to transmit a PRACH preamble to the base station via a PRACH resource connected to the beam RS.

The present specification can solve a beam block problem resulting from a movement of a UE, etc. by newly defining a beam recovery procedure when a beam failure event occurs.

The present specification has also an effect that a UE can select a beam RS uniformly in all situations by selecting CSI-RS within an alternative beam RS set and a beam RS from all of SSBs if RSRP values for an alternative beam RS and all the SSBs do not exceed a threshold.

The present specification can also prevent a UE from unnecessarily selecting a large number of beam RSs by selecting, as a beam RS, only CSI-RS directly connected to a PRACH preamble.

Effects obtainable from the present invention are not limited by the effects mentioned above, and other effects which are not mentioned above can be clearly understood from the following description by those skilled in the art to which the present invention pertains.

BRIEF DESCRIPTION OF THE DRAWINGS

The accompany drawings, which are included as part of the detailed description in order to help understanding of the present invention, provide embodiments of the present invention and describe the technical characteristics of the present invention along with the detailed description.

DETAILED DESCRIPTION OF THE EMBODIMENTS

Figure 1:
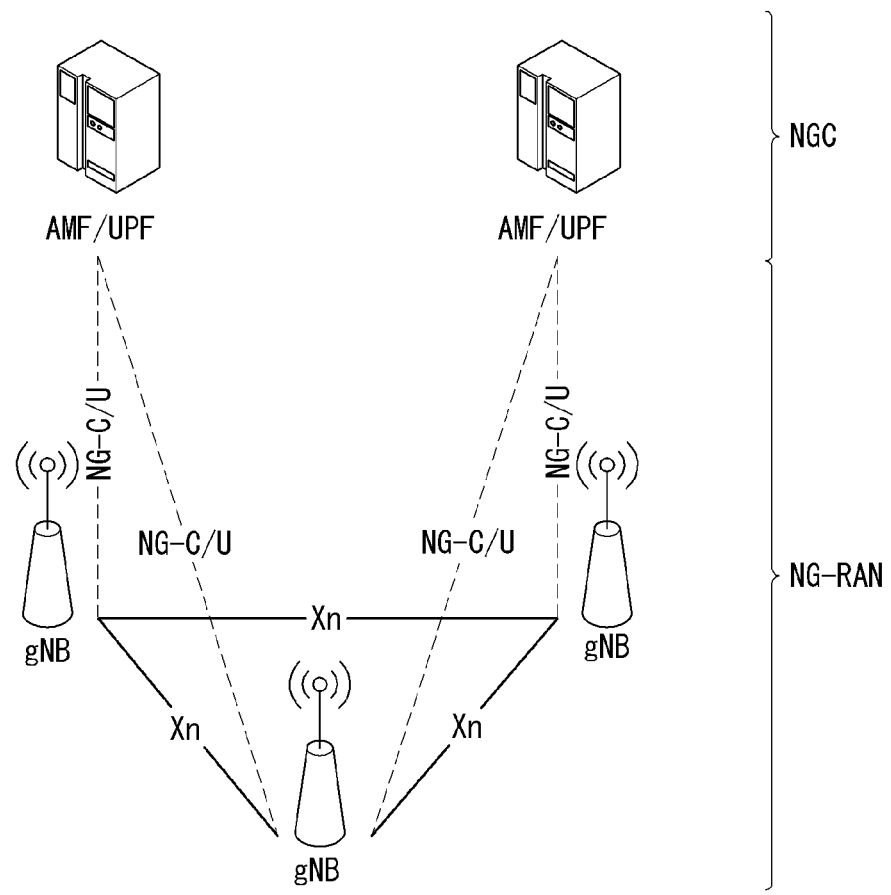
FIG. 1 illustrates an example of an overall structure of a NR system to which a method proposed by the present specification is applicable.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

DEFINITION OF TERMS eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User Plane Gateway: A Terminal Point of NG-U Interface

Three major requirement areas of 5G include (1) an enhanced mobile broadband (eMBB) area, (2) a massive machine type communication (mMTC) area, and (3) an ultra-reliable and low latency communications (URLLC) area.

Some use cases may require multiple areas for optimization, and other use cases may be focused on only one key performance indicator (KPI). 5G supports such various use cases in a flexible and reliable method.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming services (audio and video), dialogue type video and mobile Internet connections will be used more widely as more devices are connected to the Internet. Such many application programs require connectivity in which they are always turned on, in order to push real-time information and notification to a user. Cloud storage and application have rapidly increased in a mobile communication platform, and may be applied to both business and entertainment. Furthermore, cloud storage is a special use case that tows the growth of an uplink data transfer rate. 5G is also used for remote business of cloud. When a tactile interface is used, much lower end-to-end latency is required to maintain good user experiences. Entertainment, for example, cloud game and video streaming are other key elements which increase a need for the mobile broadband ability. Entertainment is essential in smartphone and tablet anywhere including high mobility environments, such as a train, a vehicle and an airplane. Another use case is augmented reality and information search for entertainment. In this case, the augmented reality requires very low latency and an amount of instant data.

Furthermore, one of the most expected 5G use cases relates to a function capable of smoothly connecting embedded sensors in all fields, i.e., mMTC. Until 2020, it is expected that potential IoT devices will reach 20.4 billions. The industry IoT is one of areas in which 5G performs major roles enabling smart city, asset tracking, smart utility, agriculture and security infra.

URLLC includes new services which will change the industry through remote control of major infra and a link with ultra reliability/low available latency, such as a self-driving vehicle. A level of reliability and latency is essential for smart grid control, industry automation, robot engineering, and drone control and adjustment.

Next, multiple use cases are described in more detail.

5G can supplement fiber-to-the-home (FTTH) and cable-based broadband (or DOCSIS) as means for providing a stream evaluated as gigabits per second in several hundreds of megabits per second. Such fast speed is required to deliver TV with a resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be combined with an edge network server of a network operator.

An automotive is expected to be an important and new motive power in 5G along with many use cases for the mobile communication of an automotive. For example, entertainment for a passenger requires a high capacity and a high mobility mobile broadband at the same time. This reason is that future users continue to expect a high-quality connection regardless of their location and speed. Another use case of the automotive field is an augmented reality dashboard. The augmented reality dashboard displays overlapping information, which identifies an object in the dark and notifies a driver of a distance and a movement of the object, over a thing seen by the driver through a front window. In the future, a wireless module enables communication between automotives, information exchange between an automotive and a supporting infrastructure, and information exchange between the automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable and very fast communication between different self-driven vehicles and between an automotive and infra. In the future, a self-driven vehicle will perform all driving activities, and a driver will be focused on things other than traffic, which cannot be identified by a vehicle itself. Technical requirements of a self-driven vehicle require ultra-low latency and ultra-high speed reliability so that traffic safety is increased up to a level which cannot be achieved by a person.

Smart city and smart home mentioned as a smart society will be embedded into a high-density radio sensor network. A distributed network of intelligent sensors will identify the cost of a city or home and conditions for energy-efficient maintenance. A similar configuration may be performed for each home. All of a temperature sensor, a window and heating controller, a burglar alarm and home appliances are wirelessly connected. Many of these sensors are typically a low data transfer rate, low power, and the low cost. However, for example, real-time HD video may be required in a specific type of device for surveillance.

The consumption and distribution of energy including heat or gas are highly distributed and thus require an automated control of a distributed sensor network. A smart grid collects information, and interconnects these sensors using digital information and a communication technology so that the sensors operate based on the information. The information may include behaviors of a supplier and a consumer, and thus the smart grid may improve the distribution of fuel, such as electricity, in an efficient, reliable, economical, production-sustainable and automated manner. The smart grid may be considered to be another sensor network having small latency.

A health part owns many application programs which can reap benefits of mobile communication. A communication system can support a remote treatment providing a clinical treatment at a distant place. This helps to reduce a barrier for the distance and can improve access to medical services which are not continuously used at remote farming areas. Furthermore, this is used to save life in an important treatment and an emergency condition. A radio sensor network based on mobile communication can provide remote monitoring and sensors for parameters, such as a heart rate and a blood pressure.

Radio and mobile communication becomes increasingly important in an industry application field. Wiring requires the high installation and maintenance cost. Thus, the possibility that a cable will be replaced with reconfigurable radio links is an attractive opportunity in many industrial fields. However, achieving the possibility requires that a radio connection operates with latency, reliability and capacity similar to those of the cable and that management is simplified. Low latency and a very low error probability are a new requirement for a connection to 5G.

Logistics and freight tracking are an important use case for mobile communication, which enables the tracking of inventory and packages anywhere using a location-based information system. The logistics and freight tracking use case typically requires a low data speed, but requires a wide area and reliable location information.

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | Δf = $2^μ \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max}/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
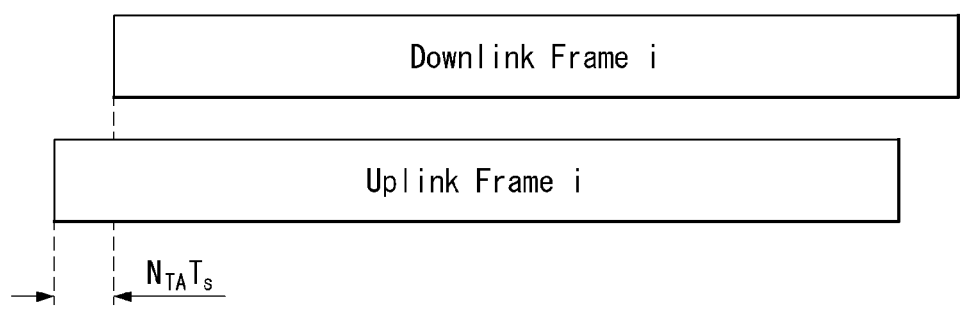
FIG. 2 illustrates a relation between an uplink frame and a downlink frame in a wireless communication system to which a method proposed by the present specification is applicable.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^μ \in \{0, \ldots, N_{subframe}^{slots,μ}-1\}$ in a in a subframe, and in ascending order of $n_{s,f}^μ \in \{0, \ldots, N_{frame}^{slots,μ}-1\}$ in a radio frame. One slot is composed of continuous OFDM symbols of $N_{symb}^μ$, $N_{symb}^μ$ and determined depending on a numerology in use and slot configuration. The start of slots in a subframe is temporally aligned with the start of OFDM symbols $n_s^μ N_{symb}^μ$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | | | | Slot configuration | | |
| | | 0 | | | 1 | |
| μ | $N_{symb}^μ$ | $N_{frame}^{slots,μ}$ | $N_{subframe}^{slots,μ}$ | $N_{symb}^μ$ | $N_{frame}^{slots,μ}$ | $N_{subframe}^{slots,μ}$ |
|---|---|---|---|---|---|---|
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | | Slot configuration | | | | |
|---|---|---|---|---|---|---|
| | | 0 | | | 1 | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
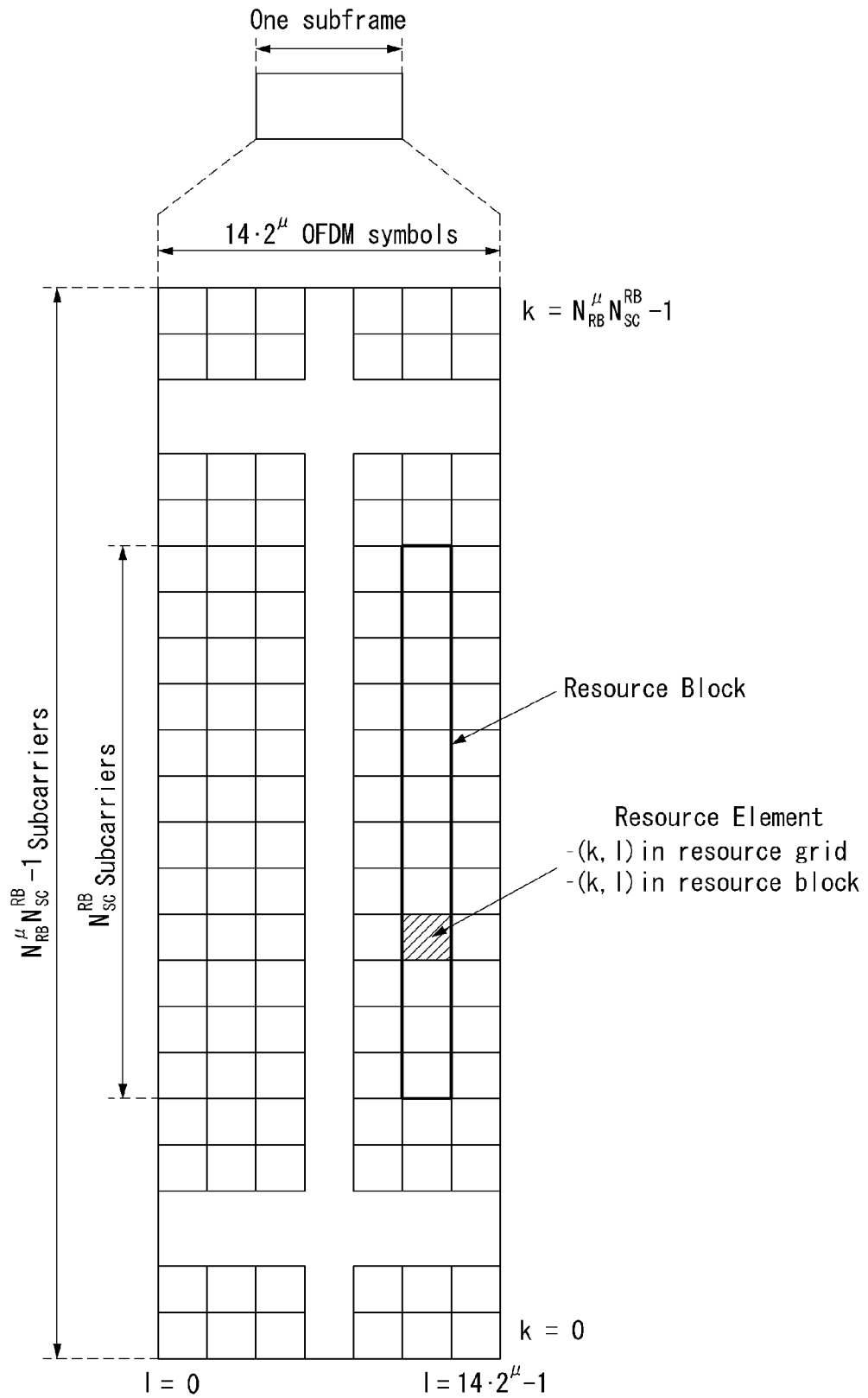
FIG. 3 illustrates an example of a resource grid supported in a wireless communication system to which a method proposed by the present specification is applicable.
Figure 4:
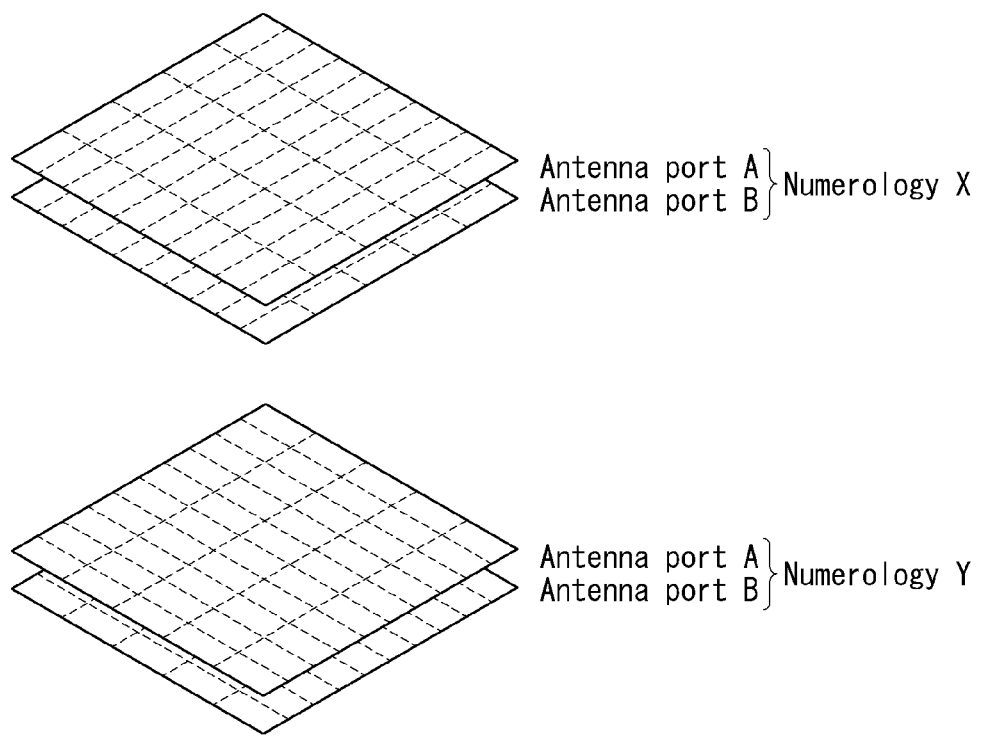
FIG. 4 illustrates examples of a resource grid per antenna port and numerology to which a method proposed by the present specification is applicable.

FIG. 3 illustrates an example of a resource grid supported in a wireless communication system to which a method proposed by the present disclosure may be implemented.

Referring to FIG. 3, a resource grid is composed of $N_{RB}^{\mu}N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^{\mu}N_{sc}^{RB}$ subcarriers, and $2^{\mu}N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 3, one resource grid may be configured for the numerology μ and an antenna port p.

Each element of the resource grid for the numerology μ and the antenna port p is indicated as a resource element, and may be uniquely identified by an index pair (k,l). Herein, $k=0, \ldots, N_{RB}^{\mu}N_{sc}^{RB}-1$ is an index in the frequency domain, and $l=0, \ldots, 2^{\mu}N_{symb}^{(\mu)}-1$ indicates a location of a symbol in a subframe. To indicate a resource element in a slot, the index pair (k,l) is used. Herein, $l=0, \ldots, N_{symb}^{\mu}-1$.

The resource element (k,l) for the numerology μ and the antenna port p corresponds to a complex value $a_{k,l}^{(p,\mu)}$. When there is no risk of confusion or when a specific antenna port or numerology is specified, the indexes p and μ may be dropped and thereby the complex value may become $a_{k,l}^{(p)}$ or $a_{k,l}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Uplink Control Channel

Physical uplink control signaling should be able to carry at least hybrid-ARQ acknowledgements, CSI reports (possibly including beamforming information), and scheduling requests.

At least two transmission methods are supported for an UL control channel supported in an NR system.

The UL control channel can be transmitted in short duration around last transmitted UL symbol(s) of a slot. In this case, the UL control channel is time-division-multiplexed and/or frequency-division-multiplexed with an UL data channel within a slot. For the UL control channel in short duration, transmission over one symbol duration of a slot is supported.

Short uplink control information (UCI) and data are frequency-division-multiplexed both within a UE and between UEs, at least for the case where physical resource blocks (PRBs) for short UCI and data do not overlap.

In order to support time division multiplexing (TDM) of a short PUCCH from different UEs in the same slot, a mechanism is supported to inform the UE of whether or not symbol(s) in a slot to transmit the short PUCCH is supported at least above 6 GHz.

At least following is supported for the PUCCH in 1-symbol duration: 1) UCI and a reference signal (RS) are multiplexed in a given OFDM symbol in a frequency division multiplexing (FDM) manner if the RS is multiplexed, and 2) there is the same subcarrier spacing between downlink (DL)/uplink (UL) data and PUCCH in short-duration in the same slot.

At least a PUCCH in short-duration spanning 2-symbol duration of a slot is supported. In this instance, there is the same subcarrier spacing between DL/UL data and the PUCCH in short-duration in the same slot.

At least semi-static configuration, in which a PUCCH resource of a given UE within a slot. i.e., short PUCCHs of different UEs can be time-division multiplexed within a given duration in a slot, is supported.

The PUCCH resource includes a time domain, a frequency domain, and when applicable, a code domain.

The PUCCH in short-duration can span until an end of a slot from UE perspective. In this instance, no explicit gap symbol is necessary after the PUCCH in short-duration.

For a slot (i.e., DL-centric slot) having a short UL part, 'short UCI' and data can be frequency-division multiplexed by one UE if data is scheduled on the short UL part.

The UL control channel can be transmitted in long duration over multiple UL symbols so as to improve coverage. In this case, the UL control channel is frequency-division-multiplexed with the UL data channel within a slot.

UCI carried by a long duration UL control channel at least with a low peak to average power ratio (PAPR) design can be transmitted in one slot or multiple slots.

Transmission across multiple slots is allowed for a total duration (e.g. 1 ms) for at least some cases.

In the case of the long duration UL control channel, the TDM between the RS and the UCI is supported for DFT-S-OFDM.

A long UL part of a slot can be used for transmission of PUCCH in long-duration. That is, the PUCCH in long-duration is supported for both a UL-only slot and a slot having the variable number of symbols comprised of a minimum of 4 symbols.

For at least 1 or 2 UCI bits, the UCI can be repeated within N slots (N>1), and the N slots may be adjacent or may not be adjacent in slots where PUCCH in long-duration is allowed.

Simultaneous transmission of PUSCH and PUCCH for at least the long PUCCH is supported. That is, uplink control on PUCCH resources is transmitted even in the case of the presence of data. In addition to the simultaneous PUCCH-PUSCH transmission, UCI on the PUSCH is supported.

Intra-TTI slot frequency-hopping is supported.

DFT-s-OFDM waveform is supported.

Transmit antenna diversity is supported.

Both TDM and FDM between short duration PUCCH and long duration PUCCH are supported at least for different UEs in one slot. In a frequency domain, a PRB (or multiple PRBs) is a minimum resource unit size for the UL control channel. If hopping is used, a frequency resource and the hopping may not spread over a carrier bandwidth. Further, a UE-specific RS is used for NR-PUCCH transmission. A set of PUCCH resources is configured by higher layer signaling, and a PUCCH resource within the configured set is indicated by downlink control information (DCI).

As part of the DCI, it should be possible to dynamically indicate (at least in combination with RRC) the timing between data reception and hybrid-ARQ acknowledgement transmission. A combination of the semi-static configuration and (for at least some types of UCI information) dynamic signaling is used to determine the PUCCH resource for both 'long and short PUCCH formats'. Here, the PUCCH resource includes a time domain, a frequency domain, and when applicable, a code domain. The UCI on the PUSCH, i.e., using some of the scheduled resources for the UCI is supported in case of simultaneous transmission of UCI and data.

At least UL transmission of at least single HARQ-ACK bit is supported. A mechanism enabling the frequency diversity is supported. In case of ultra-reliable and low-latency communication (URLLC), a time interval between scheduling request (SR) resources configured for a UE can be less than a slot.

Beam Management

In NR, beam management is defined as follows.

Beam management: includes at least the following description as a set of L1/L2 procedures for obtaining and maintaining a set of TRP(s) and/or UE beams that may be used for DL and UL transmission and reception:

Beam determination: an operation in which the TRP(s) or the UE selects a transmitting/receiving beam thereof.

Beam measurement: an operation in which the TRP(s) or the UE measures characteristics of a received beamforming signal.

Beam reporting: an operation in which the UE reports information of a beamformed signal based on beam measurement.

Beam sweeping: an operation that covers a spatial region using a beam transmitted and/or received during a time interval in a predetermined manner.

Further, Tx/Rx beam correspondence in the TRP and UE is defined as follows.

When at least one of the following conditions is satisfied, Tx/Rx beam correspondence in the TRP is maintained.

The TRP may determine a TRP reception beam for uplink reception based on downlink measurement of the UE for one or more transmission beams thereof.

The TRP may determine a TRP Tx beam for downlink transmission based on uplink measurement thereof for one or more Rx beams thereof.

When at least one of the following conditions is satisfied, Tx/Rx beam correspondence at the UE is maintained.

The UE may determine a UE Tx beam for uplink transmission based on downlink measurement thereof for one or more Rx beams thereof.

The UE may determine a UE reception beam for downlink reception based on an indication of TRP based on uplink measurement of one or more Tx beams.

A capability indication of UE beam correspondence related information is supported with TRP.

The following DL L1/L2 beam management procedures are supported within one or more TRPs.

P-1: P-1 is used for enabling UE measurement of different TRP Tx beams in order to support selection of TRP Tx beam/UE Rx beam(s).

Beamforming in TRP generally includes intra/inter-TRP Tx beam sweep in different beam sets. For beamforming at the UE, beamforming generally includes UE Rx beam sweep from a set of different beams.

P-2: UE measurement for different TRP Tx beams are used for changing inter/intra-TRP Tx beam(s).

P-3: When the UE uses beamforming, UE measurement of the same TRP Tx beam is used for changing a UE Rx beam Aperiodic reporting triggered by at least the network is supported in P-1, P-2, and P-3 related operations.

UE measurement based on RS for beam management (at least CSI-RS) is configured with K (total number of beams) beams, and the UE reports measurement results of the selected N number of Tx beams. Here, N is not necessarily a fixed number. Procedures based on RS for mobility purposes are not excluded. When at least N<K, reporting information includes information representing a measurement quantity of the N number of beam(s) and the N number of DL transmission beams. In particular, for K'>1 non-zero-power (NZP) CSI-RS resources, the UE may report a CSI-RS resource indicator (CRI) of N'.

The UE may be set with the following higher layer parameters for beam management.

N≥1 reporting setting, M≥1 resource setting

Links between reporting setting and resource setting are set in agreed CSI measurement setting.

CSI-RS-based P-1 and P-2 are supported with resource and reporting settings.

P-3 may be supported regardless of presence or absence of reporting setting.

Reporting setting including at least the following contents:

Information representing the selected beam

L1 measurement reporting

Time domain operations (e.g., aperiodic operation, periodic operation, semi-persistent operation)

Frequency granularity when several frequency granularity is supported

Resource setting including at least the following contents:

Time domain operation (e.g., aperiodic operation, periodic operation, semi-persistent operation)

RS type: at least NZP CSI-RS

At least one CSI-RS resource set. Each CSI-RS resource set includes K≥1 CSI-RS resources (some parameters of the K number of CSI-RS resources may be the same. For example, port number, time domain operation, density and period)

Further, NR supports the following beam reporting in consideration of L group of L>1.

Information representing a minimal group

Measurement quantity of N1 beam (L1 RSRP and CSI reporting support (when CSI-RS is for CSI acquisition)

If applicable, information representing the N1 number of DL transmission beams

The above-described group-based beam reporting may be configured in UE units. Further, the group-based beam reporting may be turned off in UE units (e.g., when L=1 or N1=1).

NR supports that the UE may trigger a mechanism that recovers from beam failure.

A beam failure event occurs when a quality of a beam pair link of a related control channel is sufficiently low (e.g., comparison with a threshold value, timeout of a related timer). A mechanism that recovers from a beam failure (or fault) is triggered when a beam fault occurs.

The network is explicitly configured in the UE having resources for transmitting UL signals for a recovery purpose. A configuration of resources is supported at a location in which the BS listens from all or some directions (e.g., random access region).

An UL transmission/resource reporting the beam fault may be located at the same time instance as that of a PRACH (resource orthogonal to a PRACH resource) or may be located at a time instance (may be configured for UE) different from that of the PRACH. Transmission of the DL signal is supported so that the UE may monitor a beam to identify new potential beams.

NR supports beam management regardless of a beam-related indication. When a beam-related indication is provided, information about a UE side beamforming/receiving procedure used for CSI-RS based measurement may be indicated to the UE through QCL. As QCL parameters to be supported in the NR, parameters for delay, Doppler, average gain, etc., used in an LTE system as well as spatial parameters for beamforming at a receiving terminal will be added, and QCL parameters to be supported in the NR may include an angle of arrival related parameters in terms of UE receiving beamforming and/or an angle of departure related parameters in terms of BS receiving beamforming. The NR supports use of the same or different beams in the control channel and the corresponding data channel transmission.

For NR-PDCCH transmission supporting robustness of beam pair link blocking, the UE may be configured to simultaneously monitor an NR-PDCCH on the M number of beam pair links. Here, M>1 and a maximum value of M may depend on at least a UE capability.

The UE may be configured to monitor an NR-PDCCH on different beam pair link(s) in different NR-PDCCH OFDM symbols. Parameters related to UE Rx beam setting for monitoring the NR-PDCCH on multiple beam pair links are configured by higher layer signaling or MAC CE and/or are considered in a search space design.

At least NR supports an indication of a spatial QCL hypothesis between a DL RS antenna port(s) and a DL RS antenna port(s) for demodulation of a DL control channel A candidate signaling method for a beam indication of the NR-PDCCH (i.e., configuration method of monitoring the NR-PDCCH) is a combination of MAC CE signaling, RRC signaling, DCI signaling, specification transparent, and/or an implicit method, and signaling methods thereof.

For reception of a unicast DL data channel, the NR supports an indication of a spatial QCL hypothesis between the DL RS antenna port and the DMRS antenna port of the DL data channel.

Information representing the RS antenna port is displayed through DCI (downlink grant). Further, the information represents the DMRS antenna port and the RS antenna port being QCL. A different set of the DMRS antenna port of the DL data channel may be represented as a different set of the RS antenna port and QCL.

Hybrid Beamforming

Existing beamforming technology using multiple antennas may be classified into an analog beamforming scheme and a digital beamforming scheme according to a location to which beamforming weight vector/precoding vector is applied.

The analog beamforming scheme is a beamforming technique applied to an initial multi-antenna structure. The analog beamforming scheme may mean a beamforming technique which branches analog signals subjected to digital signal processing into multiple paths and then applies phase-shift (PS) and power-amplifier (PA) configurations for each path.

For analog beamforming, a structure in which an analog signal derived from a single digital signal is processed by the PA and the PS connected to each antenna is required. In other words, in an analog stage, a complex weight is processed by the PA and the PS.

Figure 5:
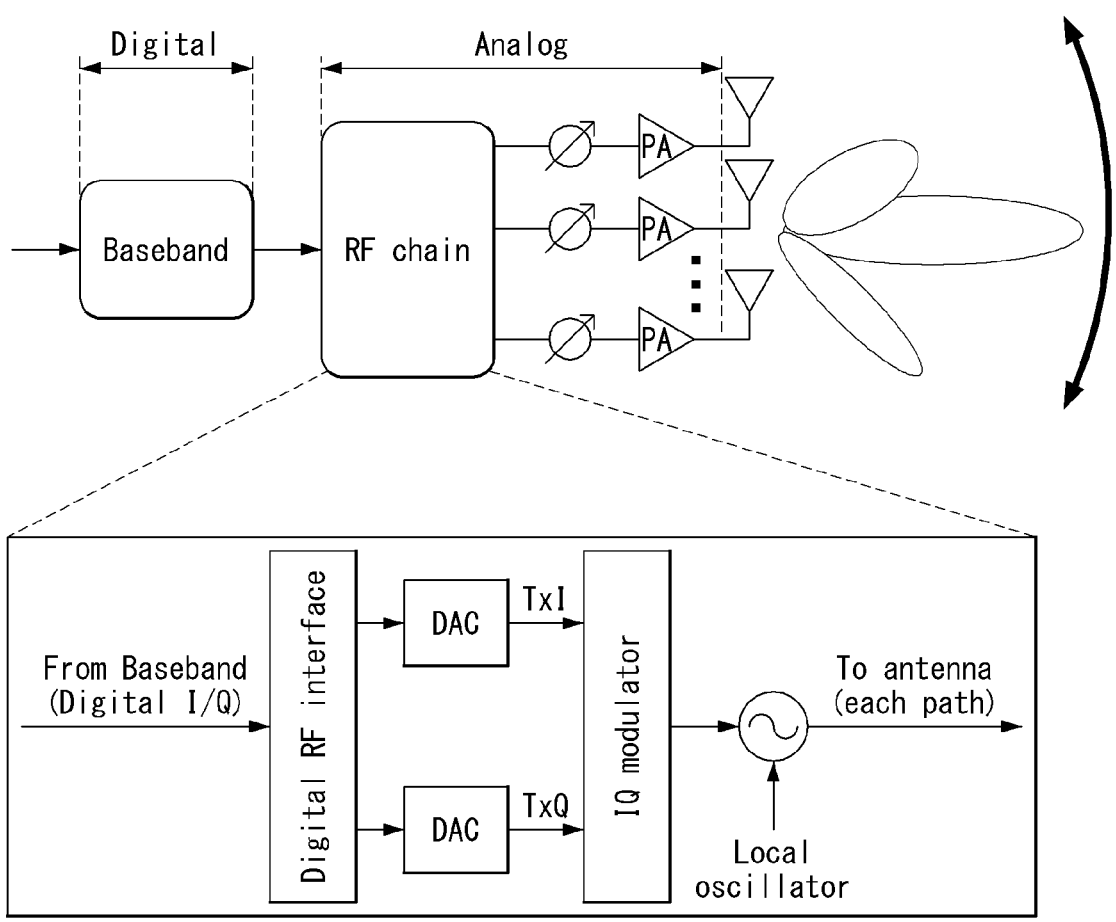
FIG. 5 illustrates an example of a block diagram of a transmitter consisting of an analog beamformer and an RF chain.

FIG. 5 illustrates an example of a block diagram of a transmitter consisting of an analog beamformer and an RF chain. FIG. 5 is merely for convenience of explanation and does not limit the scope of the present invention.

In FIG. 5, the RF chain means a processing block for converting a baseband (BB) signal into an analog signal. The analog beamforming scheme determines beam accuracy according to characteristics of elements of the PA and PS and may be suitable for narrowband transmission due to control characteristics of the elements.

Further, since the analog beamforming scheme is configured with a hardware structure in which it is difficult to implement multi-stream transmission, a multiplexing gain for transfer rate enhancement is relatively small. In addition, in this case, beamforming per UE based on orthogonal resource allocation may not be easy.

On the contrary, in the case of digital beamforming scheme, beamforming is performed in a digital stage using a baseband (BB) process in order to maximize diversity and multiplexing gain in a MIMO environment.

Figure 6:
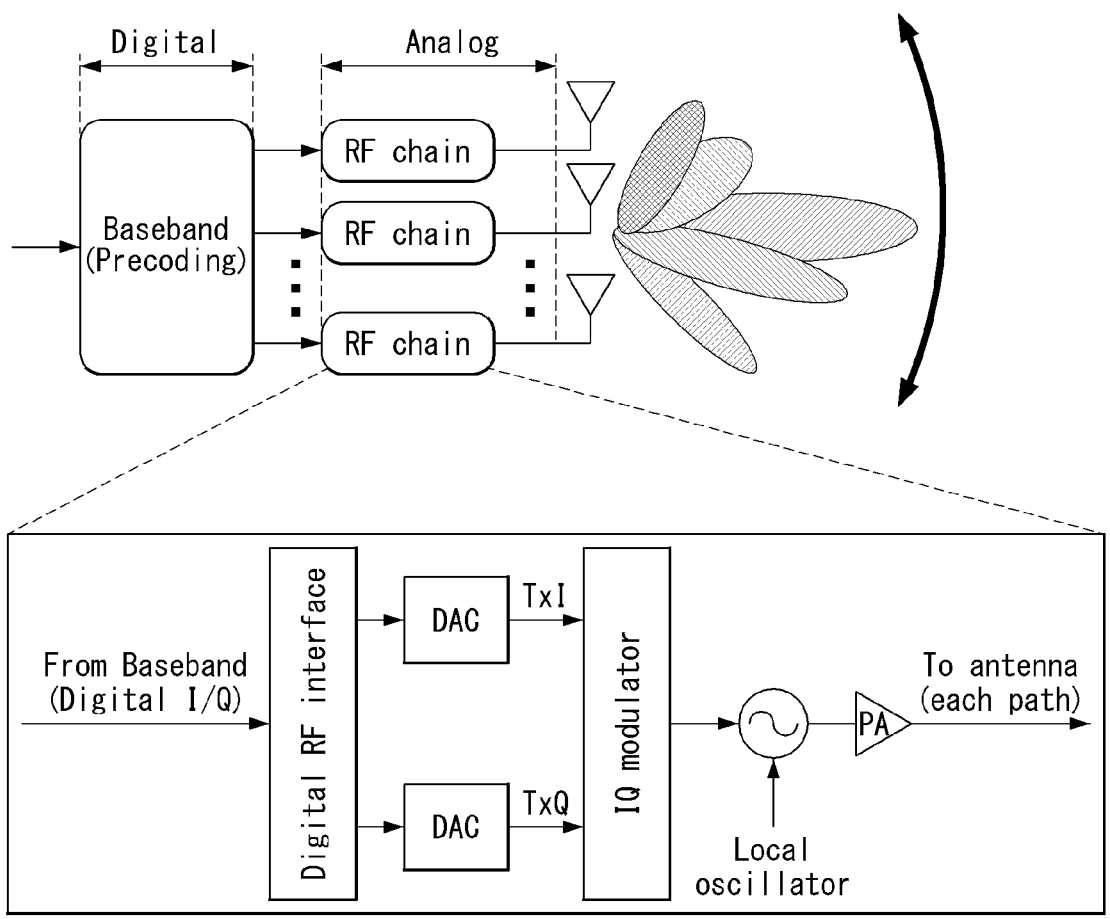
FIG. 6 illustrates an example of a block diagram of a transmitter consisting of a digital beamformer and an RF chain.

FIG. 6 illustrates an example of a block diagram of a transmitter consisting of a digital beamformer and an RF chain. FIG. 6 is merely for convenience of explanation and does not limit the scope of the present invention.

In FIG. 6, beamforming can be performed as precoding is performed in a BB process. Here, the RF chain includes a PA. This is because a complex weight derived for beamforming is directly applied to transmission data in the case of digital beamforming scheme.

Furthermore, since different beamforming can be performed per UE, it is possible to simultaneously support multi-user beamforming. Besides, since independent beamforming can be performed per UE to which orthogonal resources are assigned, scheduling flexibility can be improved and thus a transmitter operation suitable for the system purpose can be performed. In addition, if a technology such as MIMO-OFDM is applied in an environment supporting wideband transmission, independent beamforming can be performed per subcarrier.

Accordingly, the digital beamforming scheme can maximize a maximum transfer rate of a single UE (or user) based on system capacity enhancement and enhanced beam gain. On the basis of the above-described properties, digital beamforming based MIMO scheme has been introduced to existing 3G/4G (e.g., LTE(-A)) system.

In the NR system, a massive MIMO environment in which the number of transmit/receive antennas greatly increases may be considered. In cellular communication, a maximum number of transmit/receive antennas applied to an MIMO environment is generally assumed to be 8. However, as the massive MIMO environment is considered, the number of transmit/receive antennas may increase to tens or hundreds or more.

If the aforementioned digital beamforming scheme is applied in the massive MIMO environment, a transmitter has to perform signal processing on hundreds of antennas through a BB process for digital signal processing. Hence, signal processing complexity may significantly increase, and complexity of hardware implementation may remarkably increase because as many RF chains as the number of antennas are required.

Furthermore, the transmitter needs independent channel estimation for all the antennas. In addition, in case of an FDD system, since the transmitter requires feedback information about a massive MIMO channel composed of all antennas, pilot and/or feedback overhead may considerably increase.

On the other hand, when the aforementioned analog beamforming scheme is applied in the massive MIMO environment, hardware complexity of the transmitter is relatively low.

However, an increase degree of a performance using multiple antennas is very low, and flexibility of resource allocation may decrease. In particular, it is difficult to control the beam per frequency in the wideband transmission.

Accordingly, instead of exclusively selecting only one of the analog beamforming scheme and the digital beamforming scheme in the massive MIMO environment, there is a need for a hybrid transmitter configuration scheme in which an analog beamforming structure and a digital beamforming structure are combined.

Analog Beam Scanning

In general, analog beamforming may be used in a pure analog beamforming transmitter/receiver and a hybrid beamforming transmitter/receiver. In this instance, analog beam scanning can perform estimation for one beam at the same time. Thus, a beam training time required for the beam scanning is proportional to the total number of candidate beams.

As described above, the analog beamforming necessarily requires a beam scanning process in a time domain for beam estimation of the transmitter/receiver. In this instance, an estimation time $T_s$ for all of transmit and receive beams may be represented by the following Equation 2.

$$T_s = t_s \times (K_T \times K_R) \quad \text{[Equation 2]}$$

In Equation 2, $t_s$ denotes time required to scan one beam, $K_T$ denotes the number of transmit beams, and $K_R$ denotes the number of receive beams.

Figure 7:
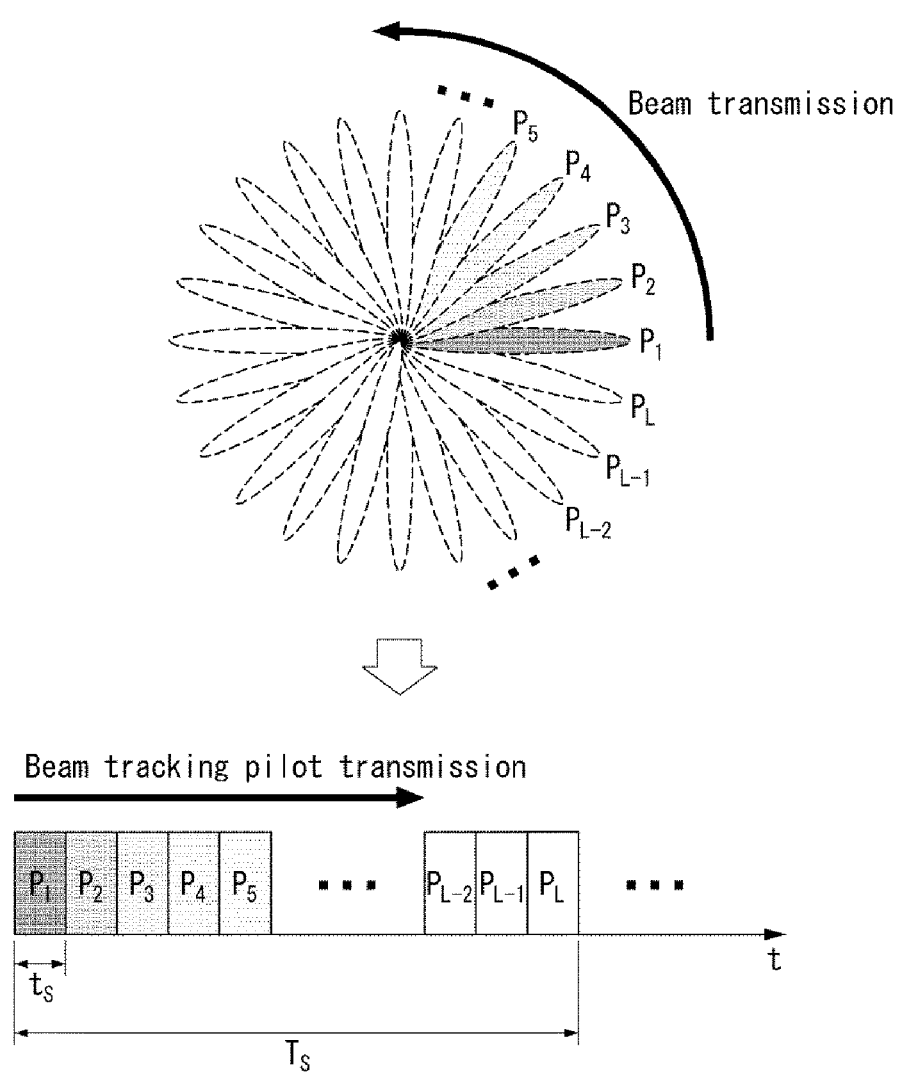
FIG. 7 illustrates an example of an analog beam scanning scheme according to various embodiments of the present invention.

FIG. 7 illustrates an example of an analog beam scanning scheme according to various embodiments of the present invention. FIG. 7 is merely for convenience of explanation and does not limit the scope of the present invention.

In FIG. 7, it is assumed that the total number $K_T$ of transmit beams is L, and the total number $K_R$ of receive beams is 1. In this case, since the total number of candidate beams is L, L time intervals are required in the time domain.

In other words, since only the estimation of one beam can be performed in a single time interval for analog beam estimation, L time intervals are required to estimate all of L beams $P_1$ to $P_L$ as shown in FIG. 7. The UE feeds back, to the base station, an identifier (ID) of a beam with a highest signal strength after an analog beam estimation procedure is ended. That is, as the number of individual beams increases according to an increase in the number of transmit/receive antennas, a longer training time may be required.

Because the analog beamforming changes a magnitude and a phase angle of a continuous waveform of the time domain after a digital-to-analog converter (DAC), a training interval for an individual beam needs to be secured for the analog beamforming, unlike the digital beamforming. Thus, as a length of the training interval increases, efficiency of the system may decrease (i.e., a loss of the system may increase).

Channel State Information (CSI) Feedback

In most cellular systems including the LTE system, a UE receives a pilot signal (reference signal) for channel estimation from a base station, calculates channel state information (CSI), and reports the calculated CSI to the base station.

The base station transmits a data signal based on the CSI fed back from the UE.

In the LTE system, the CSI fed back by the UE includes channel quality information (CQI), a precoding matrix index (PMI), and a rank indicator (RI).

CQI feedback is radio channel quality information provided to the base station for the purpose (link adaptation purpose) of providing a guide as to which modulation and coding scheme (MCS) the base station applies when transmitting data.

If radio quality between the base station and the UE is high, the UE may feedback a high CQI value to the base station, and the base station may transmit data using a relatively high modulation order and a low channel coding rate. On the contrary, if radio quality between the base station and the UE is low, the UE may feedback a low CQI value to the base station, and the base station may transmit data using a relatively low modulation order and a high channel coding rate.

PMI feedback is preferred precoding matrix information provided to the base station for the purpose of providing a guide as to which MIMO precoding scheme the base station applies when installing multiple antennas.

The UE estimates a downlink MIMO channel between the base station and the UE from the pilot signal and recommends which MIMO precoding scheme is applied to the base station through the PMI feedback.

In the LTE system, only linear MIMO precoding that can be represented in the form of a matrix is considered in PMI configuration.

The base station and the UE share a codebook consisting of multiple precoding matrices, and each MIMO precoding matrix within the codebook has a unique index.

Thus, the UE feeds back an index corresponding to a most preferred MIMO precoding matrix within the codebook as a PMI to thereby minimize an amount of feedback information of the UE.

A PMI value does not need to necessarily consist of only one index. For example, in the LTE system, when the number of transmit antenna ports is 8, it is configured so that a final 8tx MIMO precoding matrix can be derived by combining two indexes (i.e., first PMI and second PMI).

RI feedback is information about the number of preferred transmission layers provided to the base station for the purpose of providing a guide as to the number of transmission layers preferred by the UE when the UE and the base station enable multi-layer transmission through spatial multiplexing by installing multiple antennas.

The RI has a very close relationship with the PMI. This is because the base station should know which precoding has to be applied to each layer according to the number of transmission layers.

In PMI/RI feedback configuration, a method of configuring a PMI codebook on the basis of single layer transmission, defining a PMI per layer, and feeding back the PMI may be considered. However, the method has a disadvantage in that an amount of PMI/RI feedback information greatly increases due to an increase in the number of transmission layers.

Thus, in the LTE system, a PMI codebook has been defined per number of transmission layers. That is, N Nt×R matrices are defined in a codebook for R-layer transmission, where R is the number of layers, Nt is the number of transmit antenna ports, and N is the size of the codebook.

Accordingly, in the LTE system, the size of a PMI codebook is defined irrespective of the number of transmission layers. Since the number R of transmission layers is eventually equal to a rank value of a precoding matrix (Nt×R matrix) as the PMI/RI is defined with such a structure, a term of rank indicator (RI) has been used.

The PMI/RI described in the present specification is not limited to mean an index value and a rank value of a precoding matrix represented as Nt×R matrix, like PMI/RI in the LTE system.

The PMI described in the present specification represents information of a preferred MIMO precoder among MIMO precoders applicable to a transmitter, and a form of the precoder is not limited to only a linear precoder that can be represented as a matrix as in the LTE system. Further, the RI described in the present specification is interpreted in a broader sense than RI in LTE and includes all of feedback information representing the number of preferred transmission layers.

The CSI may be obtained in all of system frequency domains and may be also obtained in some frequency domains. In particular, it may be useful for a wideband system to obtain CSI for some preferred frequency domains (e.g. subband) per UE and feedback the CSI.

In the LTE system, CSI feedback is performed on an uplink channel. In general, periodic CSI feedback is performed on a physical uplink control channel (PUCCH), and aperiodic CSI feedback is performed on a physical uplink shared channel (PUSCH) which is an uplink data channel.

The aperiodic CSI feedback is temporarily performed only when the base station desires CSI feedback information, and the base station triggers the CSI feedback on a downlink control channel such as PDCCH/ePDCCH.

Figure 8:
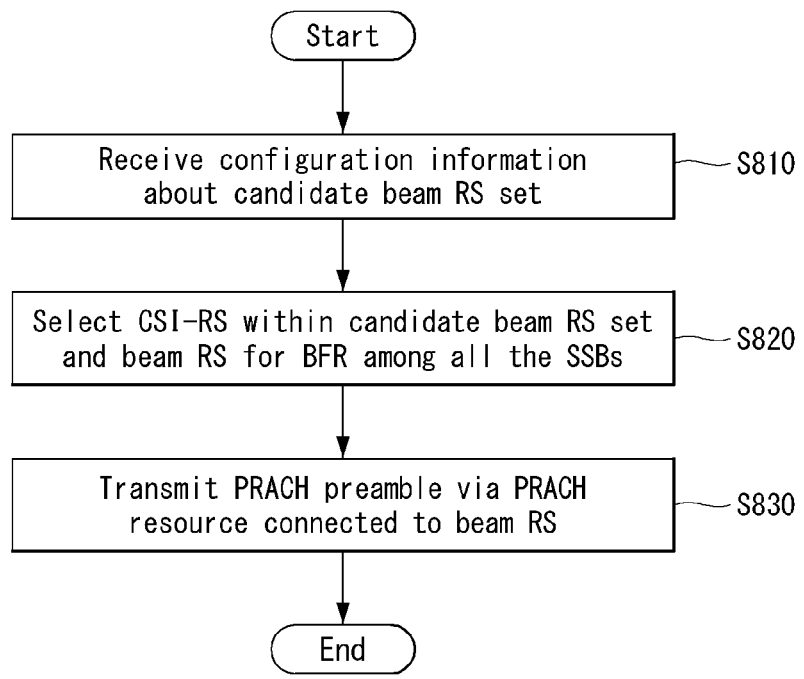
FIG. 8 is a flow chart illustrating an example of an operation method of a UE for performing a beam failure recovery proposed by the present specification.

When the CSI feedback has been triggered in the LTE system, which information the UE should feedback is classified into PUSCH CSI reporting modes as shown in FIG. 8. The UE is previously informed of, which PUSCH CSI reporting mode the UE should operate in, through a higher layer message.

Reference Signals in NR

Downlink (DL) physical layer signals of the 3GPP NR system are as follows. More detailed description refers to 3GPP TS 38.211 and TS 38.214.

CSI-RS: signal for DL channel state information (CSI) acquisition and DL beam measurement Tracking RS (TRS): signal for fine time/frequency tracking of the UE DL DMRS: RS for PDSCH demodulation DL phase-tracking RS (PT-RS): RS transmitting for phase noise compensation of the UE Synchronization signal block (SSB): means a resource block consisting of the specific number of consecutive symbols and resource blocks on time/frequency side consisting of a primary synchronization signal (PSS), a secondary SS, and PBCH (+PBCH DMRS) (the same beam is applied to signals within one SSB)

In addition, uplink (UL) physical layer signals of the 3GPP NR system are as follows. In the same manner, more detailed description refers to 3GPP TS 38.211 and TS 38.214.

SRS: signal for UL channel state information (CSI) acquisition, UL beam measurement, and antenna port selection UL DMRS: RS for PUSCH demodulation UL phase-tracking RS (PT-RS): RS transmitting for phase noise compensation of the base station Beam Management and Beam Recovery A base station can request to a UE periodic CSI reporting, semi-persistent (SP) CSI reporting (only during a specific time duration, periodic CSI reporting is activated or consecutive CSI reporting is performed a plurality of times), or aperiodic CSI reporting.

Here, in the periodic CSI reporting and the semi-persistent CSI reporting, UL resource (e.g., PUCCH in LTE) for the CSI reporting in a specific cycle is assigned to the UE in a period in which the reporting is activated.

Downlink (DL) reference signal (RS) transmission of the base station is necessary for CSI measurement of the UE.

In case of beamformed system to which (analog) beamforming is applied, DL transmission (Tx)/reception (Rx) beam pair for the DL RS transmission/reception and UL Tx/Rx beam pair for uplink control information (UCI) (e.g., CSI, ACK/NACK) transmission/reception need to be determined.

A procedure for determining the DL beam pair may be composed of combinations of (1) a procedure that a base station transmits DL RSs corresponding to a plurality of TRP Tx beams to a UE, (2) a TRP Tx beam selection procedure that the UE selects and/or reports one among the TRP Tx beams, (3) a procedure that the base station repeatedly transmits the same RS corresponding to each TRP Tx beam to the UE, and (4) a procedure that the UE measures the repeatedly transmitted signals using different UE Rx beams to select a UE Rx beam.

Further, a procedure for determining the UL beam pair may be composed of combinations of (1) a procedure that a UE transmits UL RSs corresponding to a plurality of UE Tx beams to a base station, (2) a UE Tx beam selection procedure that the base station selects and/or signals one among the UE Tx beams, (3) a procedure that the UE repeatedly transmits the same RS corresponding to each UE Tx beam to the base station, and (4) a procedure that the base station measures the repeatedly transmitted signals using different TRP Rx beams to select a TRP Rx beam.

If beam reciprocity (or beam correspondence) of DL/UL is established, i.e., if in communication between the base station and the UE, it is assumed that gNB DL Tx beam and gNB UL Rx beam are matched and UE UL Tx beam and UE DL Rx beam are matched, a procedure for determining the other may be omitted if only one of the DL beam pair and the UL beam pair is determined.

The determination process for the DL beam pair and/or the UL beam pair may be performed periodically or aperiodically.

If the number of candidate beams is large, a required RS overhead may increase. Therefore, it is not preferable that the determination process for the DL beam pair and/or the UL beam pair occurs frequently.

It is assumed that the UE performs periodic or semi-persistent (SP) CSI reporting after a determination process for DL/UL beam pair is completed.

Here, a CSI-RS including a single antenna port or a plurality of antenna ports for CSI measurement of the UE may be beamformed to a TRP Tx beam determined as a DL beam and transmitted, and a transmission cycle of the CSI-RS may be equal to a CSI reporting cycle or more frequently transmitted.

Alternatively, the UE is able to transmit an aperiodic CSI-RS in conformity with a CSI reporting cycle or transmit more frequently.

The UE may periodically transmit measured CSI information to a predetermined UL Tx beam in the UL beam pair determination process.

A beam mismatch problem may occur according to a cycle of beam management configured when a DL/UL beam management process is performed.

In particular, if a radio channel environment changes (e.g., a LoS (line-of-sight) environment is changed to a non-LoS environment due to the block of beam) due to a movement of a location of the UE, or a rotation of the UE, or a movement of an object around the UE, an optimal DL/UL beam pair may change.

Such a change may be considered that a beam failure event has occurred when tracking has failed in a beam management process generally performed by a network indication.

The UE may decide whether to generate the beam failure event based on the reception quality of a DL RS. The UE has to send a report message for such a situation or a message for beam recovery request (hereinafter, referred to as 'beam recovery request message').

The beam recovery request message may be variously represented as a beam failure recovery request message, a control signal, a control message, a first message, or the like.

The base station receiving the beam recovery request message from the UE can perform the beam recovery through various processes including beam RS transmission to the UE for the beam recovery, beam reporting request to the UE, etc.

A series of beam recovery processes mentioned above will be referred to as 'beam recovery'.

The beam failure recovery (BFR) is described in more detail below.

Beam Failure Detection (BFD)

Beam failure detection refers to a case where all of PDCCH beams are reduced to a fixed quality value (Q_out) or less, or a case where a beam failure instance occurs once.

Here, the quality is on the basis of hypothetical block error rate (BLER). That is, if it is assumed that control information has been transmitted to corresponding PDCCH, it may mean the possibility of failure to demodulate the corresponding information.

If the beam failure instance occurs by the (consecutively) previously configured number of times, the UE declares the beam failure.

New Beam Identification & Selection

Step 1) A UE finds a beam with a fixed quality value (Q_in) or more among RSs that a base station configures as a candidate beam RS set.

If one beam RS exceeds a threshold, the UE selects the corresponding beam RS.

If a plurality of beam RSs exceeds the threshold, the UE selects any one among the corresponding beam RSs.

If there is no beam RS exceeding the threshold, the UE performs the following Step 2.

Here, the beam quality is on the basis of RSRP.

A RS beam set configured by the base station may include the following three cases.

All of beam RSs in a RS beam set consist of SSBs.

All of beam RSs in a RS beam set consist of CSI-RS resources.

All of beam RSs in a RS beam set consist of SSBs and CSI-RS resources.

Step 2) The UE finds a beam with a fixed quality value (Q_in) or more among SSBs (connected to contention based PRACH resources).

If one SSB exceeds a threshold, the UE selects the corresponding beam RS.

If a plurality of SSBs exceeds the threshold, the UE selects any one among the corresponding beam RSs.

If there is no SSB exceeding the threshold, the UE performs the following Step 3.

Step 3) The UE selects arbitrary SSB among the SSBs (connected to contention based PRACH resources).

BFRQ & Monitoring gNB's Response

A UE transmits, to a gNB, PRACH resource and preamble configured to be directly or indirectly connected to a beam RS (CSI-RS or SSB) selected in the above process.

Here, the direct connection configuration is used in the following cases.

Case where contention-free PRACH resource and preamble are configured for a specific RS in a candidate beam RS set which is separately configured for the use of BFR Case where (contention based) PRACH resource and preamble are mapped one-to-one to SSBs commonly configured for another use of random access, etc.

Here, the indirect connection configuration is used in the following cases.

Case where contention-free PRACH resource and preamble are not configured for a specific RS in a candidate beam RS set which is separately configured for the use of BFR In this instance, the UE selects (contention-free) PRACH resource and preamble connected to SSB that is designated (i.e. quasi-co-located (QCLed) with respect to spatial Rx parameter) as receivable by the same reception beam as the corresponding CSI-RS.

The UE monitors a gNB's response for the corresponding PRACH transmission.

If there is no response within a predetermined time, the UE repeatedly performs a new beam identification and selection process and a process of BFRQ and monitoring gNB's response.

The above process can be performed until the PRACH transmission reaches a previously configured maximum number of times N_max, or a configured timer expires.

If the timer expires, the UE can stop the contention free PRACH transmission, but the contention based PRACH transmission due to the SSB selection can be performed until it reaches the N_max.

As described above, in the current standard document, the new beam identification and selection process for BFR may be summarized as follows.

Step 1) A UE finds a beam exceeding a threshold among candidate beam RSs that are separately configured for the use of BFR.

Case1: candidate beam RSs=CSI-RS resources only
Case2: candidate beam RSs=SSB resources only
Case3: candidate beam RSs=CSI-RS resource(s) and SSB resource(s)

Step 2) If there is no beam found in the above step, the UE finds SSB exceeding the threshold.

Step 3) If there is no beam found in the above step, the UE selects arbitrary SSB that does not exceed the threshold.

In the Case 2, an operation of the UE is as follows.
All SSBs={SSB#0, . . . , SSB#(M−1)}=set#0
SSBs included in the candidate beam RS set for BFR={SSB#n1, SSB#n2, SSB#nT}=set#1

Here, set#1 may be a subset of set#0. Thus, the UE selects the beam from set#1 in the Step 1), set#0-set#1 in the Step 2), and set#0 in the Step 3). That is, beams included in set#1 may be selected in the Step 3) (and the Step 2)) as well as the Step 1).

In the Case 1, an operation of the UE is as follows.
All SSBs={SSB#0, . . . , SSB#(M−1)}=set#0
CSI-RSs included in the candidate beam RS set for BFR={CSI-RS#n1, CSI-RS#n2, . . . , CSI-RS#nT}=set#1

Here, set#1 is not a subset of set#0. Thus, the UE selects the beam from set#1 in the Step 1), set#0 in the Step 2), and set#0 in the Step 3). That is, beams included in set#1 may be selected in only the Step 1).

In the Case 3, an operation of the UE is as follows.
All SSBs={SSB#0, . . . , SSB#(M−1)}=set#0
SSBs/CSI-RSs included in the candidate beam RS set for BFR={CSI-RS#n1, CSI-RS#n2, CSI-RS#nT}=set#1_0 ∪ {SSB#m1, SSB#m2, . . . , SSB#mQ}=set#1_1=set#1

Here, ∪ denotes a union, and set#1 is not a subset of set#0.

Thus, the UE selects the beam from set#1 in the Step 1), set#0-set#1_1 (=set#0-set#1) in the Step 2), and set#0 in the Step 3). That is, CSI-RS resources among beam RSs included in set#1 may be selected in only the Step 1), but SSB resources among the beam RSs included in set#1 may be selected in the Step 3) (and the Step 2)) as well as the Step 1).

As described above, according to the current standard document, in the Step 3), i.e., when there is no beam exceeding the threshold among candidate beam RSs and among all of SSBs (connected to PRACH), the UE has an operational inconsistency in which the selection is excluded or allowed depending on whether the candidate beam RS is CSI-RS or SSB. More specifically, only SSB belonging to the candidate beam RS can be selected in the Step 3).

That is, if candidate beam RSs that are separately configured for the use of BFR are CSI-RSs only, and there is no RS with RSRP exceeding a threshold among the corresponding RSs, there is a problem that the UE results in selecting arbitrary SSB only according to the current standard document.

More specifically, in general, although the base station configures CSI-RS resources as candidate beams (having a narrower beam width) capable of transmitting a control signal and data to the corresponding UE, and one contention-free PRACH resource has been assigned to each CSI-RS resource, if there is no beam satisfying the quality among the corresponding candidate beams and there is no beam satisfying the quality among the SSBs connected to the contention based PRACH resources, the base station causes a problem of preferentially selecting SSB over CSI-RS.

In this case, the UE transmits contention based PRACH connected to the selected SSB. In this instance, because the quality of the corresponding SSB is not good, the UE has a high possibility of performing a large amount of PRACH retransmissions for power ramping and contention resolution, and as a result, consumes more power.

In this case, if the UE selects CSI-RS instead of SSB, retransmission due to at least contention between PRACHs may not occur by transmitting the contention-free PRACH resource. Therefore, the power of the UE can be less consumed.

Accordingly, the present specification provides a method that the UE can select arbitrary RS among CSI-RSs or SSBs if candidate beam RSs are CSI-RSs only and there is no RS with RSRP exceeding a threshold among the corresponding RSs, in order to solve the above problem.

Hereinafter, various methods proposed by the present specification are described.

(Method 1)

Method 1 describes that when there is no resource, in which RSRPs for a corresponding RS and a corresponding SSB exceed a threshold, among candidate beam RSs and among all the SSBs (connected to PRACH), a UE selects arbitrary beam RS among all the SSBs (connected to PRACH) and CSI-RS resources included in a candidate beam RS set.

If the Method 1 is applied, the UE may select a beam from set#1 in Step 1, set#0-set#1 in Step 2, and set#0∪set#1 in Step 3 in all the cases (cases 1, 2, and 3) and perform a unified operation.

That is, all of beam RSs included in set#1 may be always selected even in the Step 3.

In addition, if there is an indirect connection configuration between CSI-RS resources in a candidate beam RS set and PRACH resource and preamble (i.e., a direct connection configuration between SSB, that is QCLed (w.r.t. (with regard to) spatial Rx parameter) with CSI-RS, and PRACH resource and preamble), the UE can exclude CSI-RS resources, that are configured to be indirectly connected to the PRACH resource/preamble, in the Step 3.

This reason is that even if the UE selects the corresponding CSI-RS resource (CSI-RS resource configured to be indirectly connected to the PRACH resource and preamble) in the Step 3 or selects SSB that is QCLed (w.r.t. spatial Rx parameter) with the corresponding CSI-RS resource, the corresponding CSI-RS resource and the SSB all have the same or similar beam while being a beam of a threshold or less in the selection of the beam and the PRACH resource.

Accordingly, it may be of no great significance that the UE includes the corresponding CSI-RS resources as a RS capable of being selected in the Step 3.

Thus, the following Method 2 is additionally proposed.
(Method 2)

Method 2 describes that when there is no resource, in which RSRPs for a corresponding RS and a corresponding SSB exceed a threshold, among candidate beam RSs and among all the SSBs (connected to PRACH), a UE selects arbitrary beam RS in CSI-RS resources configured to be directly connected to PRACH resource/preamble among all the SSBs (connected to PRACH) and CSI-RS resources included in a candidate beam RS set.

In addition, even if the CSI-RS resources are configured to be directly connected to the PRACH resource/preamble, it is not significant from the viewpoint of performance that the UE selects the corresponding CSI-RS resource or selects SSB, that is QCLed (w.r.t. spatial RX parameter) with the corresponding CSI-RS resource, if the corresponding CSI-RS resource is QCLed (w.r.t. spatial RX parameter (QCL type D in TS38.214)) with a specific SSB in the same manner as the reason mentioned above, thereby unnecessarily increasing only the RE set that the UE will select.

Thus, the following Method 3 is additionally proposed.
(Method 3)

Method 3 describes that when there is no resource exceeding a threshold among candidate beam RSs and among all the SSBs (connected to PRACH), a UE selects arbitrary beam RS in CSI-RS resources that are not configured with a QCL (w.r.t. spatial RX parameter) relation with any SSB among all the SSBs (connected to PRACH) and CSI-RS resources included in a candidate beam RS set.

In the above Method 3, as an exception to 'any SSB', a case where the CSI-RS resource is QCLed (w.r.t. spatial RX parameter) with SBS of another cell not serving cell may be excluded from the exception processing.

Apart from the issue, the present specification additionally proposes to exclude SSBs for neighbor cells other than the serving cell in 'all the SSBs' in the Step 2 and the Step 3.

That is, there may be SBSs configured for the purpose of RRM/RLM of the neighbor cells among SSBs configured to the UE. Since beam failure recovery currently considers only the operation within the serving cell, the operation of the UE that selects SSB of another cell and transmits PRACH may unnecessarily cause interference to the neighbor cells.

Unless it is implemented (e.g., to enable CoMP operation) so that interaction between cells can be closely achieved, the operation of the UE that selects SSB of another cell and transmits PRACH makes it difficult to recover the beam Thus, it may be more preferable that the set#0 consists only SSBs within the serving cell/base station.

The above cell can also be applied to a cell in terms of carrier aggregation within the same base station. This is because the beam can be independently operated per carrier.

Further, in NR, a plurality of bandwidth parts (BWPs) may be configured within the same cell/carrier, and the UE may receive data at one (or multiple) active DL BWP(s) among the BWPs for a moment and transmit data at one (or multiple) active UL BWP(s). From this perspective, SSBs to be selected in the Step 2 and the Step 3 SSBs may be limited to SSBs belonging to the active DL BWP(s).

(Method 4)

Method 4 describes that when there is no RS satisfying quality conditions among RSs belonging to candidate beam RSs (corresponding to the Step2/Step3 when RSRP of RS does not exceed a threshold), the UE selects beam RS only among SSBs that (are connected to contention based PRACH and) belong to serving cell/carrier/gNB/active BWP(s).

In the present specification, '/' means 'and/or'.

FIG. 8 is a flow chart illustrating an example of an operation method of a UE for performing a beam failure recovery proposed by the present specification.

First, a UE receives configuration information about a candidate beam reference signal (RS) set from a base station in S810.

If RS received power (RSRP) values for all of candidate beam RSs and RSRP values for all of synchronization signal blocks (SSBs) connected to a physical random access channel (PRACH) do not exceed a threshold, the UE selects a CSI-RS within the candidate beam RS set and a beam RS for the BFR among all the SSBs in S820.

The UE transmits a PRACH preamble to the base station via a PRACH resource connected to the beam RS in S830.

Here, the candidate beam RS set may include only the CSI-RS.

The CSI-RS may be configured to be directly connected to the PRACH resource.

All the SSBs may be SSBs within a serving cell, within a serving carrier, or within an active bandwidth part (BWP).

Next, a method for performing, by a UE, a beam failure recovery is described in more detail with reference to FIGS. 8 to 10.

The UE may include a transmitter for transmitting a radio signal; a receiver for receiving a radio signal; and a processor functionally connected to the transmitter and the receiver, in order to perform the beam failure recovery proposed by the present specification.

The processor of the UE controls the receiver to receive configuration information about a candidate beam RS set from a base station.

If RS received power (RSRP) values for all of candidate beam RSs and RSRP values for all of synchronization signal blocks (SSBs) connected to a physical random access channel (PRACH) do not exceed a threshold, the processor of the UE selects a CSI-RS within the candidate beam RS set and a beam RS for the BFR among all the SSBs.

The processor of the UE controls the transmitter to transmit a PRACH preamble to the base station via a PRACH resource connected to the beam RS.

The candidate beam RS set may include only the CSI-RS.

The CSI-RS may be configured to be directly connected to the PRACH resource.

All the SSBs may be SSBs within a serving cell, within a serving carrier, or within an active bandwidth part (BWP).

Overview of Device to which the Present Invention is Applicable

Figure 9:
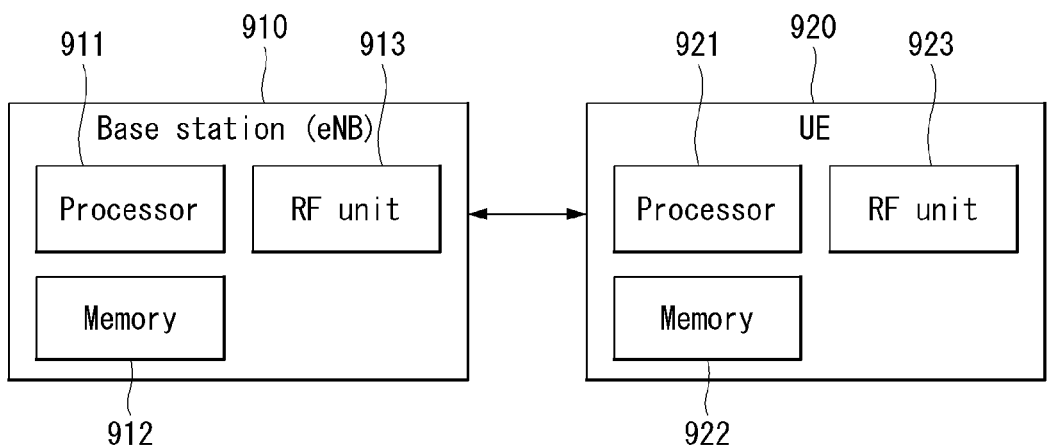
FIG. 9 illustrates a block configuration diagram of a wireless communication device according to an embodiment of the present invention.

FIG. 9 illustrates a block configuration diagram of a wireless communication device according to an embodiment of the present invention.

Referring to FIG. 9, a wireless communication system includes a base station (or network) 910 and a UE 920.

The base station and the UE may be respectively represented as a first device and a second device, or the UE and the base station may be respectively represented as a first device and a second device.

For example, the first device may be a base station, a network node, a transmitter UE, a receiver UE, a radio device, a wireless communication device, a vehicle, a vehicle with an automatic driving function, a connected car, a drone (unmanned aerial vehicle (UAV)), an artificial intelligence (AI) module, a robot, an augmented reality (AR) device, a virtual reality (VR) device, a mixed reality (MR)

device, a hologram device, a public safety device, an MTC device, an IoT device, a medical device, a FinTech device (or financial device), a security device, a climate/environment device, a device related to 5G services or a device related to the fourth industrial revolution field, or the like.

The second device may be a base station, a network node, a transmitter UE, a receiver UE, a radio device, a wireless communication device, a vehicle, a vehicle with an automatic driving function, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G services or a device related to the fourth industrial revolution field, or the like.

For example, the UE may include a cellular phone, a smart phone, a laptop computer, a digital broadcast terminal, a personal digital assistant (PDA), a portable multimedia player (PMP), a navigator, a slate PC, a tablet PC, an ultrabook, a wearable device (e.g., a smart watch, a smart glass, a head mounted display (HMD)), or the like. For example, the HMD may be a display device which is worn on the head. For example, the HMD may be used to implement the VR, AR, or MR device.

For example, the drone may be a flight vehicle that flies by a radio control signal without a person being on the flight vehicle. For example, the VR device may include a device that implements an object or a background, etc. of a virtual world. For example, the AR device may include a device implemented by connecting an object or a background of a virtual world to an object or a background, etc. of a real world. For example, the MR device may include a device implemented by merging an object or a background of a virtual world with an object or a background, etc. of a real world. For example, the hologram device may include a device that records and reproduces stereoscopic information to implement a 360-degree stereoscopic image by utilizing a phenomenon of interference of light generated when two laser beams called holography meet. For example, the public safety device may include a video relay device or a video device that can be worn on the user's body. For example, the MTC device and the IoT device may be a device that does not require a person's direct intervention or manipulation. For example, the MTC device and the IoT device may include a smart meter, a vending machine, a thermometer, a smart bulb, a door lock, a variety of sensors, or the like. For example, the medical device may be a device used for the purpose of diagnosing, treating, alleviating, handling or preventing a disease. For example, the medical device may be a device used for the purpose of diagnosing, treating, alleviating or correcting an injury or a disorder. For example, the medical device may be a device used for the purpose of testing, substituting or modifying a structure or a function. For example, the medical device may be a device used for the purpose of controlling pregnancy. For example, the medical device may include a medical device, a surgical device, a (in vitro) diagnostic device, a hearing aid or a device for a surgical procedure, and the like. For example, the security device may be a device installed to prevent a possible danger and to maintain safety. For example, the security device may include a camera, CCTV, a recorder, or a black box, and the like. For example, the FinTech device may be a device capable of providing financial services, such as mobile payment. For example, the FinTech device may include a payment device, point of sales (POS), or the like. For example, the climate/environment device may include a device for monitoring and predicting the climate/environment.

The base station 910 includes a processor 911, a memory 912, and a communication module 913.

The processor 911 implements functions, processes, and/or methods proposed in FIGS. 1 to 8. Layers of wired/wireless interface protocol may be implemented by the processor 911. The memory 912 is connected to the processor 911 and stores various types of information for driving the processor 911. The communication module 913 is connected to the processor 911 and transmits and/or receives wired/wireless signals.

The communication module 913 may include a radio frequency (RF) unit for transmitting/receiving a radio signal.

The UE 920 includes a processor 921, a memory 922, and a communication module (or RF unit) 923. The processor 921 implements functions, processes, and/or methods proposed in FIGS. 1 to 8. Layers of a radio interface protocol may be implemented by the processor 921. The memory 922 is connected to the processor 921 and stores various types of information for driving the processor 921. The communication module 923 is connected to the processor 921 and transmits and/or receives a radio signal.

The memories 912 and 922 may be inside or outside the processors 911 and 921 and may be connected to the processors 911 and 921 through various well-known means.

Further, the base station 910 and/or the UE 920 may have a single antenna or multiple antennas.

Figure 10:
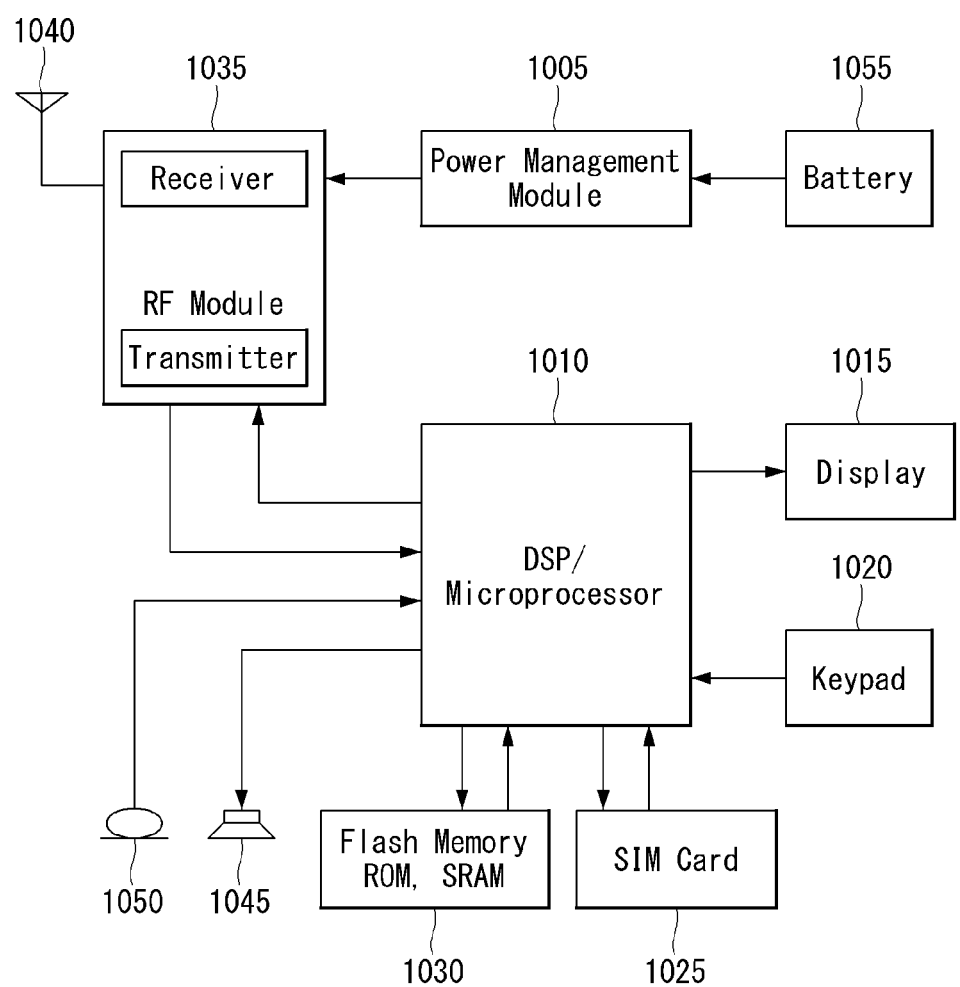
FIG. 10 illustrates a block configuration diagram of a communication device according to an embodiment of the present invention.

FIG. 10 illustrates a block configuration diagram of a communication device according to an embodiment of the present invention.

In particular, FIG. 10 illustrates in more detail the UE illustrated in FIG. 9.

Referring to FIG. 10, the UE may include a processor (or digital signal processor (DSP)) 1010, an RF module (or RF unit) 1035, a power management module 1005, an antenna 1040, a battery 1055, a display 1015, a keypad 1020, a memory 1030, a subscriber identification module (SIM) card 1025 (which is optional), a speaker 1045, and a microphone 1050. The UE may also include a single antenna or multiple antennas.

The processor 1010 implements functions, processes, and/or methods proposed in FIGS. 1 to 8. Layers of a radio interface protocol may be implemented by the processor 1010.

The memory 1030 is connected to the processor 1010 and stores information related to operations of the processor 1010. The memory 1030 may be inside or outside the processor 1010 and may be connected to the processors 1010 through various well-known means.

A user inputs instructional information, such as a telephone number, for example, by pushing (or touching) buttons of the keypad 1020 or by voice activation using the microphone 1050. The processor 1010 receives and processes the instructional information to perform an appropriate function, such as to dial the telephone number. Operational data may be extracted from the SIM card 1025 or the memory 1030. Further, the processor 1010 may display instructional information or operational information on the display 1015 for the user's reference and convenience.

The RF module 1035 is connected to the processor 1010 and transmits and/or receives an RF signal. The processor 1010 forwards instructional information to the RF module 1035 in order to initiate communication, for example, transmit a radio signal configuring voice communication data. The RF module 1035 includes a receiver and a transmitter to receive and transmit the radio signal. The antenna 1040 functions to transmit and receive the radio signal. Upon reception of the radio signal, the RF module 1035 may transfer a signal to be processed by the processor 1010 and convert the signal into a baseband. The processed signal may be converted into audible or readable information output via the speaker 1045.

The embodiments described above are implemented by combinations of components and features of the present invention in predetermined forms. Each component or feature should be considered selectively unless specified separately. Each component or feature may be carried out without being combined with another component or feature. Moreover, some components and/or features are combined with each other and can implement embodiments of the present invention. The order of operations described in embodiments of the present invention may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present invention can be implemented by various means, for example, hardware, firmware, software, or combinations thereof. When embodiments are implemented by hardware, one embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present invention can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present invention can be embodied in other specific forms without departing from essential features of the present invention. Accordingly, the aforementioned detailed description should not be construed as limiting in all aspects and should be considered as illustrative. The scope of the present invention should be determined by rational construing of the appended claims, and all modifications within an equivalent scope of the present invention are included in the scope of the present invention.

Although a beam failure recovery method in a wireless communication system according to the present invention has been described focusing on examples applying to the 3GPP LTE/LTE-A system and the 5G system, it can be applied to various wireless communication systems other than them.

What is claimed is:

1. A method for performing, by a user equipment (UE), a beam failure recovery (BFR) in a wireless communication system, the method comprising:
receiving, from a base station, configuration information about a candidate beam reference signal (RS) set, wherein the candidate beam RS set is comprised of only channel state information-reference signals (CSI-RSs);
selecting a beam RS among the CSI-RSs of the candidate beam RS set based on a predetermined condition, wherein the selecting comprises:
selecting the beam among the CSI-RSs of the candidate beam RS set having a RS received power (RSRP) value that exceeds a threshold;
selecting the beam RS among specific synchronization signal blocks (SSBs) having a RSRP value that exceeds the threshold, based on RSRP values based on none of the CSI-RSs within the candidate beam RS exceeding the threshold,
wherein SSBs which are connected to a physical random access channel (PRACH) include the specific SSBs;
selecting the beam RS among i) the SSBs and ii) the CSI-RSs, based on RSRP values for all of the CSI-RSs and RSRP values for all of the SSBs not exceeding the threshold,
wherein, based on the CSI-RSs including at least one CSI-RS indirectly connected to the PRACH, the beam RS selected based on RSRP values for all of the CSI-RSs and RSRP values for all of the SSBs not exceeding the threshold is a beam RS among i) the SSBs and ii) specific CSI-RSs directly connected to the PRACH within the CSI-RSs, and
wherein, based on at least one of the specific CSI-RSs being quasi-co-located with one of the SSBs with respect to a spatial reception parameter, the beam RS selected based on RSRP values for all of the CSI-RSs and RSRP values for all of the SSBs not exceeding the threshold is a beam RS among i) the SSBs and ii) CSI-RSs which are not quasi-co-located with any of the SSBs with respect to a corresponding spatial reception parameter within the specific CSI-RSs; and
transmitting a PRACH preamble to the base station via a PRACH resource connected to the selected beam RS.

2. The method of claim 1, wherein all the SSBs are SSBs within a serving cell, within a serving carrier, or within an active bandwidth part (BWP).

3. A user equipment (UE) for performing a beam failure recovery (BFR) in a wireless communication system, the UE comprising:
a transmitter configured to transmit a radio signal;
a receiver configured to receive the radio signal; and
a processor configured to control the transmitter and the receiver,
wherein the processor is configured to:
receive, from a base station, configuration information about a candidate beam reference signal (RS) set, wherein the candidate beam RS set is comprised of only channel state information-reference signals (CSI-RSs);
select a beam RS among the CSI-RSs of the candidate beam RS set based on a predetermined condition, wherein the selecting comprises:
select the beam among the CSI-RSs of the candidate beam RS set having a RS received power (RSRP) value that exceeds a threshold;
select the beam RS among specific synchronization signal blocks (SSBs) having a RSRP value that exceeds the threshold, based on RSRP values based on none of the CSI-RSs within the candidate beam RS exceeding the threshold,
wherein SSBs which are connected to a physical random access channel (PRACH) include the specific SSBs;
select the beam RS among i) the SSBs and ii) the CSI-RSs, based on RSRP values for all of the CSI-RSs and RSRP values for all of the SSBs not exceeding the threshold, wherein, based on the CSI-RSs including at least one CSI-RS indirectly connected to the PRACH, the beam RS selected based on RSRP values for all of the CSI-RSs and RSRP values for all of the SSBs not exceeding the threshold is a beam RS among i) the SSBs and ii) specific CSI-RSs directly connected to the PRACH within the CSI-RSs, and wherein, based on at least one of the specific CSI-RSs being quasi-co-located with one of the SSBs with respect to a spatial reception parameter, the beam RS selected based on RSRP values for all of the CSI-RSs and RSRP values for all of the SSBs not exceeding the threshold is a beam RS among i) the SSBs and ii) CSI-RSs which are not quasi-co-located with any of the SSBs with respect to a corresponding spatial reception parameter within the specific CSI-RSs; and transmit a PRACH preamble to the base station via a PRACH resource connected to the selected beam RS.

4. The UE of claim 3, wherein all the SSBs are SSBs within a serving cell, within a serving carrier, or within an active bandwidth part (BWP).

\* \* \* \* \*